July 28, 1931.  A. J. MICHELIN  1,816,543
AUTOMATIC DEVICE FOR RAISING THE WHEELS AT THE DESIRED
LEVEL IN CASE OF PUNCTURE OF THE PNEUMATIC TIRE
Filed Nov. 10, 1930
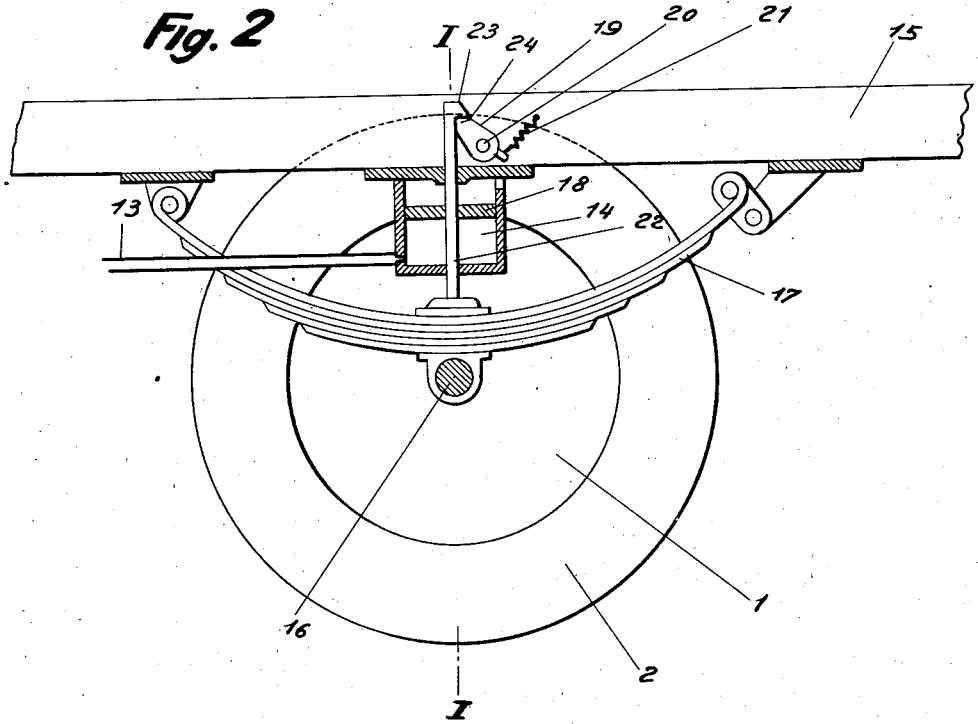
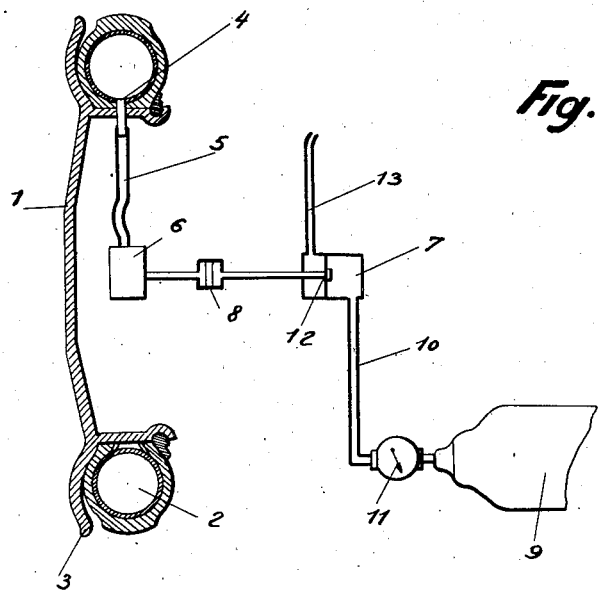
Inventor
André Jules Michelin
By Sommers + Young
Attys.

Patented July 28, 1931

1,816,543

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

AUTOMATIC DEVICE FOR RAISING THE WHEELS AT THE DESIRED LEVEL IN CASE OF PUNCTURE OF THE PNEUMATIC TIRE

Application filed November 10, 1930, Serial No. 494,770, and in France December 2, 1929.

The present invention relates to vehicles fitted with pneumatic tires and it has for its object an automatic device for raising the wheels of the vehicle at a given height with respect to the frame when the pressure in the pneumatic tire falls below a certain value. This device is more particularly intended to prevent, in the case of the wheel of a railway vehicle, the wheel flange from striking the rail-clips or the fish joint bolts in the event of the tire becoming deflated.

My invention applies more particularly to vehicles having a rigid frame and provided with springs interposed between the wheel and the frame.

The device according to my invention comprises an organ such as the deflation indicator described in my French Patent No. 649,962 or any other apparatus of the same type serving to operate an air valve, which admits compressed air from an air reservoir into a cylinder provided with a piston in such a manner that the piston may be lifted up under the action of the compressed air and thus raise the wheel at a higher level. A stationary catch such as a pawl serves to maintain the wheel in this position independently of the air pressure.

A preferred embodiment of my invention will be described with reference to the appended drawings, given merely by way of example, and in which:

Fig. 1 is a vertical diagrammatic section of a vehicle wheel fitted with the auto35 matic device according to my invention, taken on the line 1—1 of Fig. 2;

Fig. 2 is a side view corresponding to Fig. 1, but also showing the vehicle frame and the corresponding spring.

Wheel 1 is fitted with a pneumatic tire and a wheel flange 2. The valve 4 of the pneumatic tire is connected through tube 5 with a deflation indicator 6, which, as it has already been stated, may be of the type de45 scribed in my French Patent No. 649,962. Said deflation indicator controls slide valve 7 to which it is connected through a coupling 8. A compressed air receiver 9 is connected with valve 7 through tube 10.

When the air pressure in the pneumatic tire falls below a predetermined value, the piston 12 of slide valve 7 is moved toward the right and establishes a communication between tube 10 and tube 13. Said tube 13 is connected to the lower part of a cylinder 14 (see Fig. 2) disposed between the vehicle frame 15 and the axle 16 of wheel 1. Said axle 16 is connected to frame 15 through a leaf spring 17. When compressed air is sent into the lower part of cylinder 14, it exerts on piston 18 disposed within said cylinder an upward pressure which imparts to said piston an upward displacement with respect to cylinder 14 and results in axle 16 being raised with respect to frame 15. Upon said frame is disposed a pawl 19 adapted to rotate about axis 20, and submitted to the action of spring 21.

Piston 18 is secured to a rod 22, the lower end of which is connected to axle 16. The upper end of said rod is provided with a tooth 23, in such a manner that when said tooth has been raised to a certain level, the end 24 of pawl 19 prevents its downward displacement.

It will be readily understood that in this way, when the air pressure within the pneumatic tire falls below a predetermined value, compressed air is sent into the lower chamber of cylinder 14, lifts up piston 18 and raises the wheel with respect to the vehicle frame, said wheel being prevented from getting down again owing to the action of pawl 19, which maintains the wheel in its raised position.

While I have, in the above dscription, endeavored to disclose what I believe to be an efficient and practical embodiment of my invention, it is to be understood that the invention is not to be limited by the specific details as shown, but that it is subject to many and all structural variations which may express the invention and at the same time come within the scope of the appended claims.

What I claim is:

1. An automatic device for raising wheels the pneumatic tires of which have become deflated while in use which comprises a source of compressed air, pneumatic means for raising the wheel with respect to the vehicle frame, a valve for admitting compressed air from th source into the pneumatic means, and a deflation indicator connected with the pneumatic tire for operating said valve.

2. An automatic device for raising wheels the penumatic tires of which have become deflated while in use which comprises a source of compressed air, pneumatic means for raising the wheel with respect to the vehicle frame, a valve for admitting compressed air from the source into the pneumatic means, a deflation indicator connected with the pneumatic tire for operating said valve, and means for keeping the wheel in its raised position.

3. An automatic device for raising the wheels of railway vehicles fitted with pneumatic tires in the event of one of these tires becoming deflated while in use which comprises a compressed air reservoir, a cylinder disposed between the vehicle frame and the wheel axle, a piston adapted to slide within said cylinder, whereby the wheel can be raised with reference to the vehicle frame, a valve for admitting compressed air from said reservoir into said cylinder and a deflation indicator connected with the pneumatic tire for operating said valve.

4. An automatic device for raising the wheels of railway vehicles fitted with pneumatic tires in the event of one of these tires becoming deflated while in use, which comprises a compressed air reservoir, a vertical cylinder fixed to the vehicle frame, a piston adapted to slide within said cylinder, a piston rod the lower end of which is secured to the wheel axle, a slide valve for admitting compressed air from the reservoir into the lower chamber of the cylinder, and a deflation indicator connected with the pneumatic tire for operating said valve.

5. An automatic device for raising the wheels of railway vehicles fitted with pneumatic tires in the event of one of these tires becoming deflated while in use, which comprises a compressed air reservoir, a vertical cylinder fixed to the vehicle frame, a piston adapted to slide within said cylinder, a piston rod extending on both sides of the cylinder and the lower end of which is secured to the wheel axle, a slide valve for admitting compressed air from the reservoir into the lower chamber of the cylinder, a deflation indicator connected with the pneumatic tire for operating said valve, a tooth at the upper end of the piston rod, and a pawl on the vehicle frame adapted to cooperate with said tooth for keeping the wheel in its raised position.

In testimony that I claim the foregoing as my invention, I have signed my name.

ANDRÉ JULES MICHELIN.